United States Patent
Raisch et al.

(10) Patent No.: US 11,321,240 B2
(45) Date of Patent: May 3, 2022

(54) MMIO ADDRESSING USING A TRANSLATION LOOKASIDE BUFFER

(71) Applicant: International Business Machines Corporation, Armonk, NY (US)

(72) Inventors: Christoph Raisch, Gerlingen (DE); Marco Kraemer, Sindelfingen (DE); Carsten Otte, Stuttgart (DE); Jonathan D. Bradbury, Poughkeepsie, NY (US); David Craddock, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/003,808

(22) Filed: Jun. 8, 2018

(65) Prior Publication Data

US 2019/0377687 A1 Dec. 12, 2019

(51) Int. Cl.
*G06F 12/00* (2006.01)
*G06F 12/1027* (2016.01)
*G06F 13/16* (2006.01)

(52) U.S. Cl.
CPC ...... *G06F 12/1027* (2013.01); *G06F 13/1668* (2013.01); *G06F 2212/1008* (2013.01);
(Continued)

(58) Field of Classification Search
CPC ............. G06F 12/1027; G06F 13/1668; G06F 2212/1008; G06F 2212/657; G06F 2212/68; G06F 2213/0026; G06F 2212/206
See application file for complete search history.

(56) References Cited

U.S. PATENT DOCUMENTS

| | | | | |
|---|---|---|---|---|
| 5,761,448 A | * | 6/1998 | Adamson | G06F 13/423 710/104 |
| 5,936,640 A | * | 8/1999 | Horan | G06F 3/14 345/531 |

(Continued)

FOREIGN PATENT DOCUMENTS

| | | |
|---|---|---|
| TW | 202001572 A1 | 1/2020 |
| TW | 202001585 A | 1/2020 |

(Continued)

OTHER PUBLICATIONS

"AXI Memory Mapped for PCI Express Address Mapping", Xilinx Answer 65062, Initial Release Jul. 25, 2015, pp. 1-11, <https://www.xilinx.com/Attachment/Xilinx_Answer_65062_AXI_PCIe_Address_Mapping.pdf>.

(Continued)

*Primary Examiner* — David Yi
*Assistant Examiner* — Tahilba O Puche
(74) *Attorney, Agent, or Firm* — Robert J. Shatto

(57) ABSTRACT

A method for processing an instruction by a processor operationally connected to one or more buses comprises determining the instruction is to access an address of an address space that maps a memory and comprises a range of MMIO addresses. The method determines the address being accessed is within the range of MMIO addresses and generates, based on the determination, a first translation of the address being accessed to a bus identifier identifying one of the buses and a bus address of a bus address space. The bus address resulting from the translation is assigned to a device accessible via the identified bus. The method generates an entry in a translation lookaside buffer. A request directed to the device is sent via the identified bus to the bus address resulting from the translation.

25 Claims, 5 Drawing Sheets

(52) U.S. Cl.
CPC .... *G06F 2212/657* (2013.01); *G06F 2212/68* (2013.01); *G06F 2213/0026* (2013.01)

(56) References Cited

U.S. PATENT DOCUMENTS

| | | | |
|---|---|---|---|
| 6,101,568 A | 8/2000 | Richardson | |
| 6,128,684 A * | 10/2000 | Okayama | G06F 12/1027 710/109 |
| 7,653,803 B2 | 1/2010 | Hummel | |
| 7,813,366 B2 * | 10/2010 | Freimuth | G06F 13/4282 370/419 |
| 7,849,287 B2 | 12/2010 | Hummel | |
| 8,429,323 B2 * | 4/2013 | Engebretsen | G06F 13/404 710/306 |
| 8,645,594 B2 | 2/2014 | Foong | |
| 8,683,107 B2 | 3/2014 | Engebretsen | |
| 8,904,045 B2 | 12/2014 | Harriman | |
| 9,292,462 B2 * | 3/2016 | Freking | G06F 13/4022 |
| 9,331,958 B2 * | 5/2016 | Lie | H04L 49/25 |
| 9,959,214 B1 * | 5/2018 | Habusha | G06F 3/0604 |
| 10,754,808 B2 * | 8/2020 | Sethi | G06F 12/1009 |
| 2002/0152335 A1 * | 10/2002 | Holm | G06F 13/4004 710/8 |
| 2002/0174299 A1 | 11/2002 | Hayter et al. | |
| 2003/0018860 A1 | 1/2003 | Krueger | |
| 2003/0018877 A1 * | 1/2003 | Gaskins | G06F 12/1027 711/207 |
| 2004/0153853 A1 * | 8/2004 | Moriki | G06F 9/5077 714/43 |
| 2006/0212608 A1 * | 9/2006 | Arndt | G06F 12/1483 710/9 |
| 2007/0050594 A1 * | 3/2007 | Augsburg | G06F 12/1027 711/207 |
| 2007/0294444 A1 * | 12/2007 | Panesar | G06F 13/4221 710/104 |
| 2008/0126648 A1 * | 5/2008 | Brownlow | G06F 13/24 710/260 |
| 2008/0222338 A1 * | 9/2008 | Balasubramanian | G06F 9/5061 710/306 |
| 2009/0313402 A1 | 12/2009 | Nara | |
| 2010/0058026 A1 | 3/2010 | Heil | |
| 2011/0296074 A1 | 12/2011 | Nordstrom et al. | |
| 2013/0010636 A1 * | 1/2013 | Regula | H04L 49/1515 370/254 |
| 2013/0080726 A1 | 3/2013 | Kegel | |
| 2014/0237156 A1 * | 8/2014 | Regula | G06F 13/4027 710/314 |
| 2015/0254088 A1 | 9/2015 | Chou et al. | |
| 2015/0261687 A1 | 9/2015 | Craddock | |
| 2016/0092371 A1 | 3/2016 | Shanbhogue | |
| 2017/0199768 A1 * | 7/2017 | Arroyo | G06F 13/4282 |
| 2017/0228271 A1 | 8/2017 | Tsirkin | |
| 2018/0173619 A1 | 6/2018 | Sivasankaran et al. | |
| 2019/0073315 A1 * | 3/2019 | Fang | G06F 12/1027 |

FOREIGN PATENT DOCUMENTS

| | | |
|---|---|---|
| WO | 2019233689 A1 | 12/2019 |
| WO | 2019233690 A1 | 12/2019 |

OTHER PUBLICATIONS

"Memory-mapped I/O", Wikipedia, This page was last edited on Feb. 16, 2018, 5 pages, <https://en.wikipedia.org/wiki/Memory-mapped_I/O>.
"Write Combining Memory Implementation Guidelines", intel, Nov. 1998, 17 pages, <http://download.intel.com/design/PentiumII/applnots/24442201.pdf>.
"Write combining", Wikipedia, This page was last edited on Feb. 1, 2018, 2 pages, <https://en.wikipedia.org/wiki/Write_combining>.
Cong, et al., "Supporting Address Translation for Accelerator-Centric Architectures", 2017 IEEE International Symposium on High Performance Computer Architecture, pp. 37-48.
List of IBM Patents or Patent Applications Treated as Related. Filed Jun. 8, 2018. 2 pages.
Pichai, et al., "Architectural Support for Address Translation on GPUs: Designing Memory Management Units for CPU/GPUs with Unified Address Spaces",ASPLOS '14: Proceedings of the 19th international conference on Architectural support for programming languages and operating systems, pp. 743-757.
Raisch, et al., "MMIO Addressing Using a Translation Table", U.S. Appl. No. 16/003,862, filed Jun. 8, 2018.
International Search Report and Written Opinion, International Application No. PCT/EP2019/061623, dated Jul. 24, 2019, 12 pgs.
International Search Report and Written Opinion, International Application No. PCT/EP2019/061628, dated Sep. 13, 2019, 13 pgs.

* cited by examiner

MMIO ADDRESSING USING A TRANSLATION LOOKASIDE BUFFER

BACKGROUND

The present disclosure relates to the field of computer systems. More particularly, the present disclosure relates to processing an instruction by a processor.

When processing instructions by a processor, often communication with peripheral devices, e.g., input/output devices or memory devices, is required. Such communication may require an identification of the target device and/or addresses assigned to the target device. Different methods for enabling such a communication are known. Considering modern computer systems, the communication with peripheral devices gets more and more time critical. With computer systems becoming more and more complex, the complexity often comes with low efficiency regarding the required communication, when executing instructions.

SUMMARY

Various embodiments provide a method for processing an instruction by a processor as well as a computer system and a computer program product for executing the method as described by the subject matter of the independent claims. Advantageous embodiments are described in the dependent claims. Embodiments of the present invention can be freely combined with each other if they are not mutually exclusive.

In one aspect, the disclosure relates to a method for processing an instruction by a processor. The processor is operationally connected to one or more buses. The processor determines the instruction is to access an address of an address space. The address space maps a memory and additionally comprises a range of MMIO addresses. The method determines the address being accessed by the instruction is within the range of MMIO addresses. The method generates, based on the determination that the address being accessed is within the range of MMIO addresses, a first translation of the address being accessed to a bus identifier identifying one of the buses and a bus address of a bus address space. The bus address space is assigned to the identified bus. Furthermore, the bus address resulting from the translation is assigned to a device accessible via the identified bus. The method generates an entry in a translation lookaside buffer. The generated entry enables a translation of the address being accessed to the bus identifier and bus address resulting from the translation using the translation table. Based on the instruction a request directed to the device is sent via the identified bus to the bus address resulting from the translation.

In a further aspect, the disclosure relates to a system comprising one or more processors and a memory communicatively coupled to the one or more processors. The one or more processors are operationally connected to one or more buses. The computer system is configured to process an instruction by a processor. The system determines the instruction is to access an address of an address space. The address space maps a memory and in addition comprises a range of MMIO addresses. The processing comprises determining the address being accessed by the instruction is within the range of MMIO addresses. The method generates, based on the determination that the address being accessed is within the range of MMIO addresses, a first translation of the address being accessed to a bus identifier identifying one of the buses and a bus address of a bus address space. The bus address space assigned to the identified bus. Furthermore, the bus address resulting from the translation is assigned to a device accessible via the identified bus. The system generates an entry in a translation lookaside buffer. The generated entry enables a translation of the address being accessed to the bus identifier and bus address resulting from the translation using the translation table. Based on the instruction a request directed to the device is sent via the identified bus to the bus address resulting from the translation.

In a further aspect, the disclosure relates to a computer program product. The computer program product comprises a computer-readable storage medium which has machine executable program instructions embodied therewith. The computer program product is configured to process an instruction by a processor. The computer program product determines the instruction is to access an address of an address space. The address space maps a memory and in addition comprises a range of MMIO addresses. The computer program product determines the address being accessed by the further instruction is within the range of MMIO addresses. The computer program product generates, based on the determination that the address being accessed is within the range of MMIO addresses, a first translation of the address being accessed to a bus identifier identifying one of the buses and a bus address of a bus address space. The bus address space is assigned to the identified bus. Furthermore, the bus address resulting from the translation is assigned to a device accessible via the identified bus. The computer program product generates an entry in a translation lookaside buffer. The generated entry enables a translation of the address being accessed to the bus identifier and bus address resulting from the translation using the translation table. Based on the further instruction a request directed to the device is sent via the identified bus to the bus address resulting from the translation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
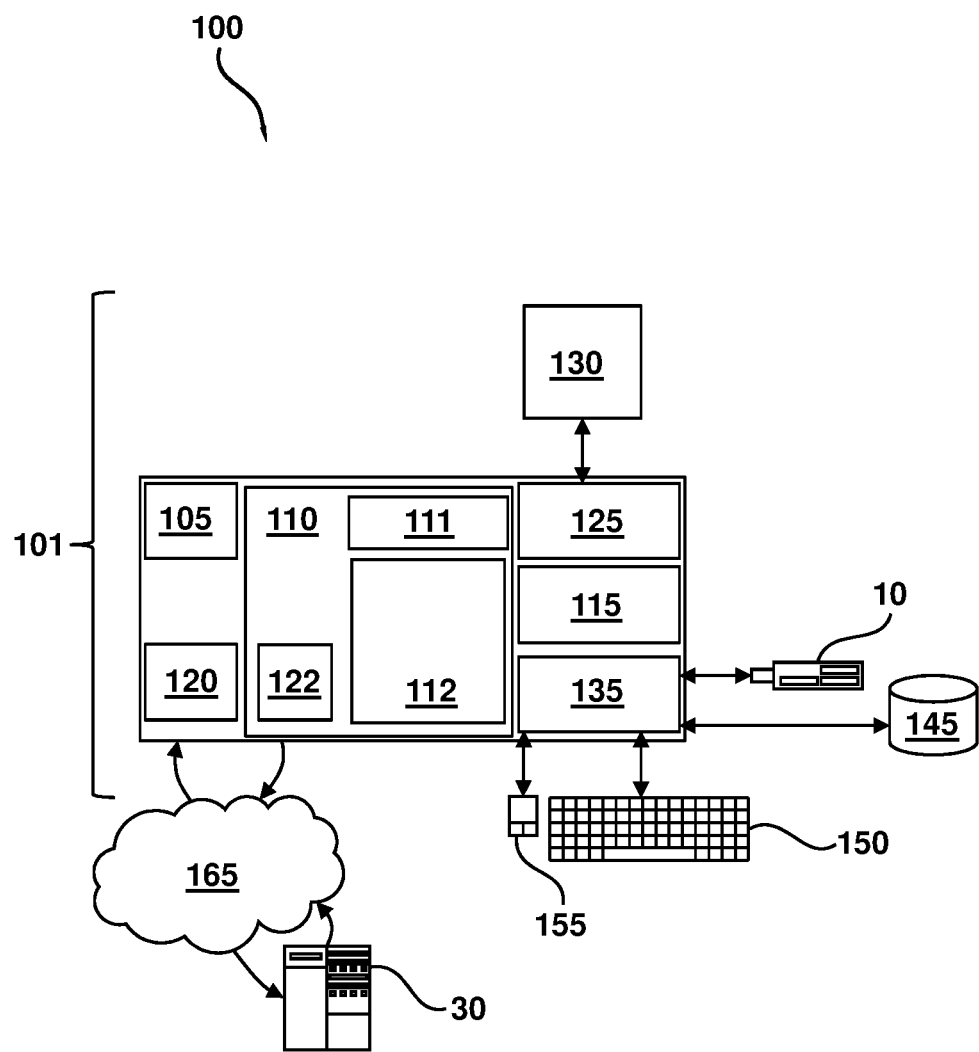
FIG. 1 depicts a block diagram of an example computer system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A MMIO (Memory Mapped Input/Output) address is an address used by processor instructions to read or write on a bus, such as e.g., a PCIe (Peripheral Component Interconnect Express) bus, in a memory mapped way. As used herein, memory mapped means from that the processor instructions use the same addressing scheme as used for accessing physical main memory. For example, an instruction with store-to-memory characteristics may send the data referred to through a PCIe bus to a PCIe device instead of storing the respective data to memory, and an instruction with load characteristics may request a device, like e.g., an I/O device, through the PCIe bus to respond with the requested data instead of reading the data from memory.

Embodiments of the present disclosure discussed herein are presented where the buses are PCIe buses, the device is a PCIe device, and the bus address is a PCIe bus address. However, the present disclosure should not be read as limited to such and may be used with or adapted to alternate buses, devices, and bus addresses.

PCIe addresses are generally organized in a hierarchical addressing structure. A BAR (Base Address Register) in PCIe defines a start address and length of an address space assigned to a component, e.g., a function, a switch, a bus, a PCIe bus unit, etc. Firmware typically initializes the addressing structure by executing a bus walk, i.e. systematically scanning or "walking through" the components accessible via the buses comprised by the computer system.

Some embodiments of the present disclosure have the beneficial effect of simplifying and speeding up device identification, and more particularly, identification of a bus and bus address assigned to a respective device. A translation table may provide a simple approach to translate a MMIO address to a bus identifier and a bus address. The device may for example be an input/output (I/O) device or a memory device. Embodiments may introduce an MMIO range between a Memory Management Unit (MMU) of a processor and a dynamic address translation (DAT) table of an operating system on one side and one or more PCIe Base Address Registers (PCIe BAR) on the other side.

In addition to the translation table, a translation lookaside buffer (TLB) is provided. The TLB buffers the translation results of translations executed using the translation table. Using such a buffer may have the beneficial effect that translation may be executed on the hardware level without involving firmware. Thus, identifying translations using a buffer may be more efficient than using a translation table each time. In particular, if the same MMIO address is to be translated repeatedly, using the buffer, buffering prior translation results may be efficient.

FIG. 1 depicts a computer system 100 suited for implementing a method for processing an instruction accessing a MMIO address and translating the MMIO address in order to determine a bus identifier and a bus address to which a request is to be send based on the instruction processed. It will be appreciated that the methods described herein are at least partly non-interactive, and automated by way of computerized systems, such as servers or embedded systems. In example embodiments though, the methods described herein may be implemented in a (partly) interactive system. These methods may further be implemented in software (e.g. instructions 112), firmware (including basic input output system (BIOS) 122), hardware (e.g., processor 105), or a combination thereof. In example embodiments, the methods described herein are implemented in software, as an executable program, and are executed by a special or general-purpose digital computer, such as a personal computer, workstation, minicomputer, or mainframe computer. The most general computer system 100 therefore includes a general-purpose computer 101.

In example embodiments, in terms of hardware architecture, as shown in FIG. 1, the computer 101 includes a processor 105, memory (e.g., main memory) 110 coupled to a memory controller 115, and one or more input and/or output (I/O) devices (or peripherals) 10 and 145 that are communicatively coupled via a local input/output controller 135. The input/output controller 135 may be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The I/O devices 10 and 145 may e.g., comprise any portable storage device 10 or stationary storage device 145.

The processor 105 is a hardware device for executing software, particularly that stored in memory 110. The processor 105 may be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 may include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 may have a distributed architecture, where various components are situated remote from one another, but may be accessed by the processor 105.

The software in memory 110 may include one or more separate programs, each of which comprises an ordered listing of executable instructions for implementing logical functions, notably functions involved in embodiments of this disclosure. In the example of FIG. 1, software in the memory 110 includes instructions 112.

The software in memory 110 may also include a suitable operating system (OS) 111. The OS 111 essentially controls the execution of other computer programs, such as instructions 112 for implementing methods as described herein.

The methods described herein may be in the form of a source program, executable program (object code), script, or any other entity comprising a set of instructions to be performed. When being provided as a source program, then the respective program needs to be translated via a compiler, assembler, interpreter, or the like, which may or may not be included within the memory 110, so as to operate properly in connection with the OS 111. Furthermore, the methods may be written as an object-oriented programming language, which has classes of data and methods, or a procedure programming language, which has routines, subroutines, and/or functions.

In example embodiments, a conventional keyboard 150 and mouse 155 may also be coupled to the input/output controller 135. Other output devices such as the I/O devices 145 may include input devices, for example but not limited to a printer, a scanner, microphone, and the like. Finally, the I/O devices 10 and 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10 and 145 may be any generalized cryptographic card or smart card known in the art. The system 100 may further include a display controller 125 coupled to a display 130. In example embodiments, the system 100 may further include a network interface for coupling to a network 165. The network 165 may be an IP-based network for communication between the computer 101 and any external server, client and the like via a broadband or other connection. The network 165 transmits and receives data between the computer 101 and external systems 30. In example embodiments, network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS may be executed when the computer 101 is activated.

When the computer 101 is in operation, the processor 105 is configured to execute instructions 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in instructions 112, as is shown in FIG. 1, the methods may be stored on any computer readable medium, such as storage 120, for use by or in connection with any computer related system or method. The storage 120 may comprise a disk storage such as HDD storage.

Figure 2:
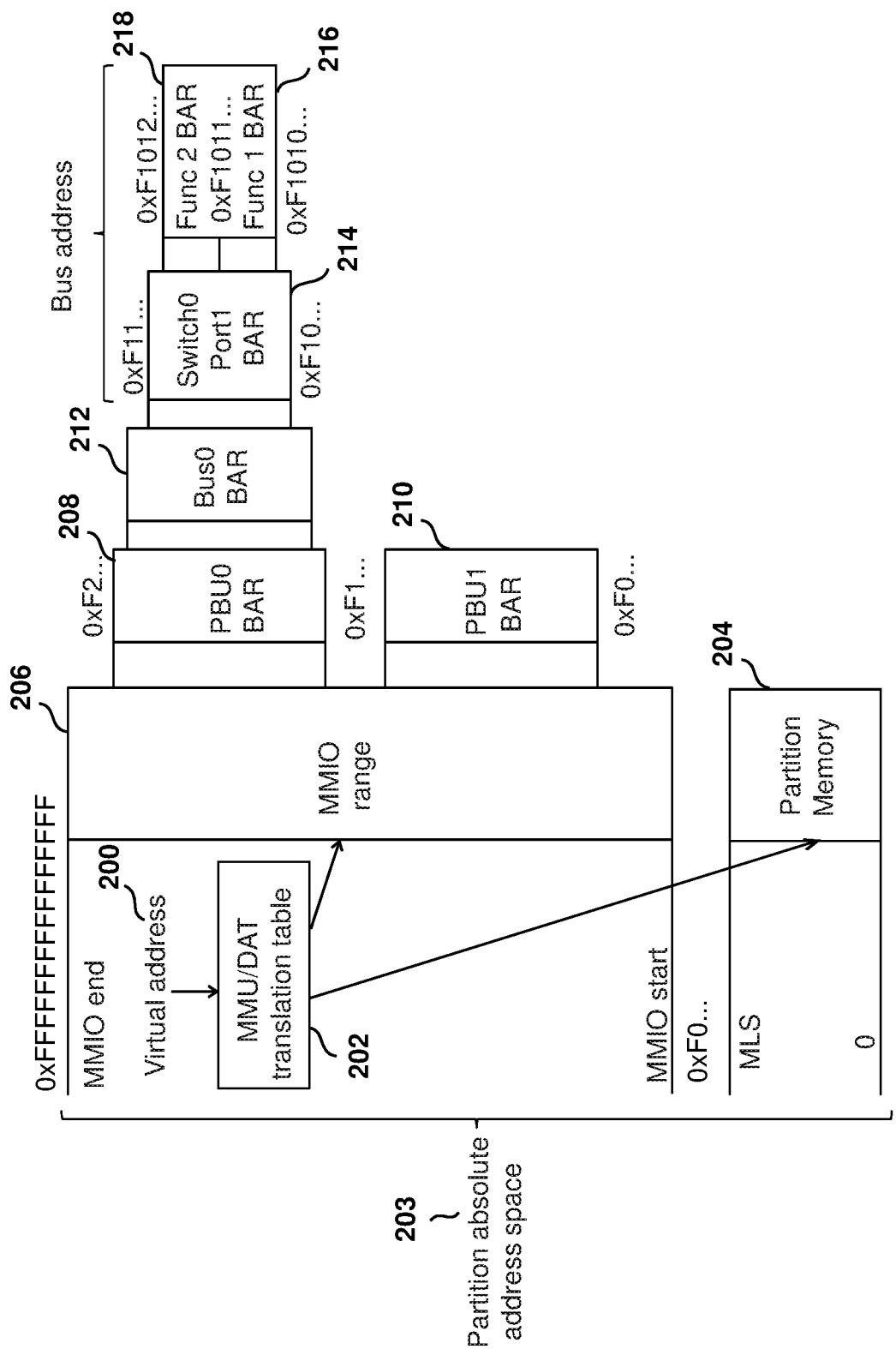
FIG. 2 depicts a schematic diagram of an example address structure, in accordance with embodiments of the present disclosure.

FIG. 2 depicts a schematic diagram illustrating an example address structure. An address space may be provided in form of a partition absolute address space 203 assigned to a partition. When the partition issues an instruction, the instruction may access a virtual address 200. The virtual address may be translated using a Memory Management Unit (MMU) and/or Dynamic Address Translation (DAT) table 202 to a partition absolute address of the partition absolute address space 203. For example, the virtual address may be converted by DAT to a real address and then by prefixing to an absolute address. The partition absolute address space 203 may comprise a range of absolute addresses mapping a memory. The respective range may extend from a lower limit, e.g., 0, to an upper limit MLS. In addition, the partition absolute address space 203 comprises a range of MMIO addresses extending from a lower limit, i.e. start like e.g., 0xF0 . . . , to an upper limit, i.e. end like e.g., 0xFFFFFFFFFFFFFFFF. The absolute address accessed by the instruction may either be comprised by the memory mapped range 204 or by the MMIO range 206 of absolute partition addresses. The MMIO range 206 may cover BARs of one or more PCIe bus units (PBU) 210 and 208. For example, absolute addresses 0xF1 . . . to 0xF2 . . . may be addresses for accessing a first PBU0 BAR 208, while other absolute partition addresses 0xF0 . . . to 0xF1 . . . may be addresses for accessing a further PBU1 BAR 210. The PBUs may comprise one or more buses. Thus, the PBU Bars may comprise one or more bus BARs. For example, PBU0 BAR 208 may comprise Bus0 Bar 212. Bus0 Bar 212 may e.g., comprise Switch0 Port1 BAR 214 which is accessible via a range of absolute partition addresses, like e.g., 0xF10 . . . to 0xF11 . . . . Switch0 Port1 BAR 214 may comprise one or more function BARs, like e.g., Func 1 BAR 216 and Func 2 BAR 218, each of which is addressable via range of absolute partition addresses comprised by the MMIO range 206. Func 1 BAR 216 may e.g., be addressable using absolute partition addresses 0xF1010 . . . to 0xF1011 . . . and Func 2 BAR 218 may e.g., be addressable using absolute partition addresses 0xF1011 . . . and 0xF1012 . . . . Thus, a MMIO address comprised by MMIO range 206 may be translated to a bus identifier identifying a bus, like e.g., Bus0, and a bus address, e.g., a PCIe bus address. The PCIe bus address may identify a PCIe bus address of a PCIe bus address space assigned to the identified bus, e.g., Bus0.

Figure 3:
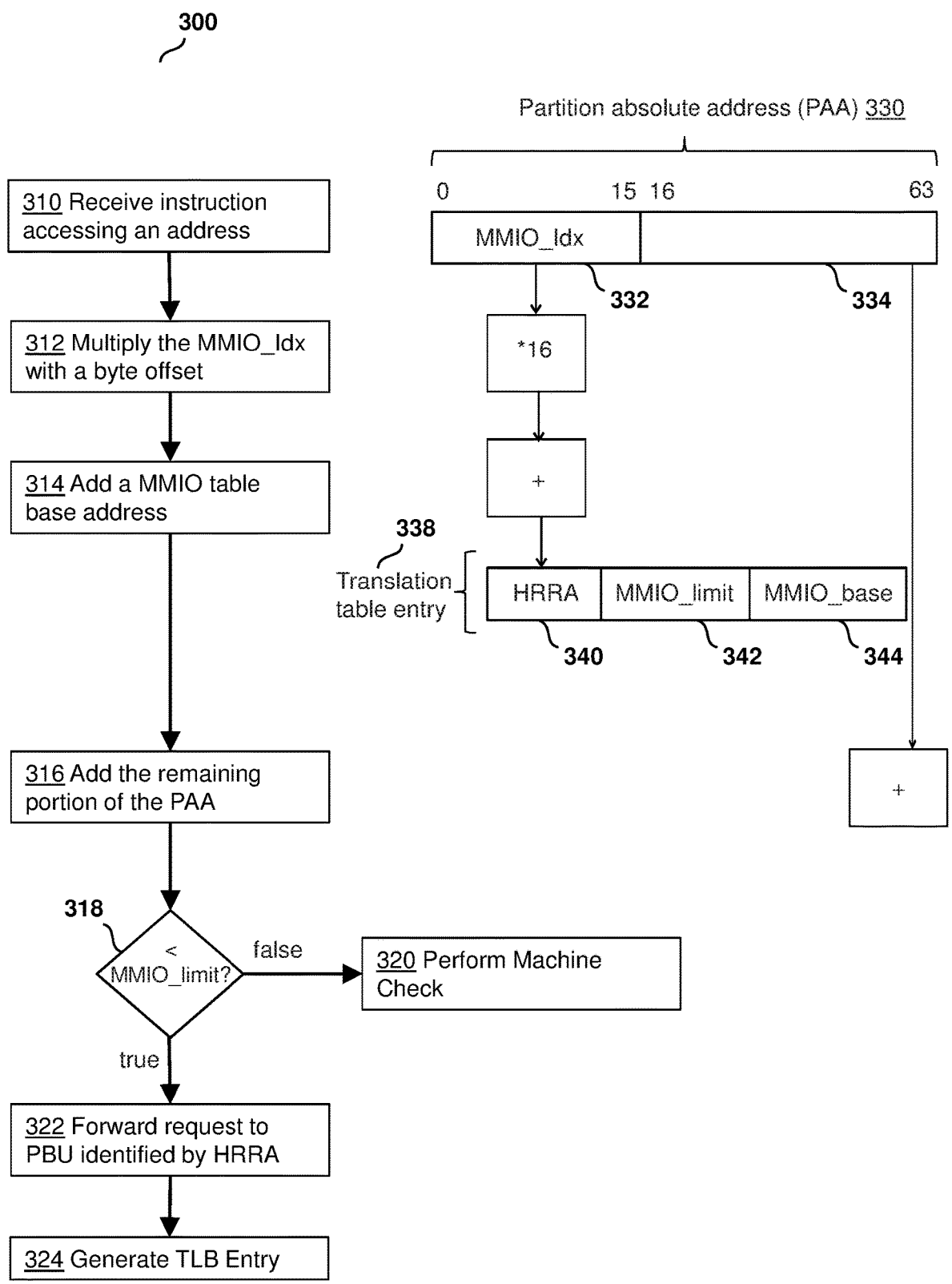
FIG. 3 depicts a schematic flow diagram of an example method for processing an instruction accessing an address of an address space, in accordance with embodiments of the present disclosure.

FIG. 3 depicts a schematic flow diagram of an example method 300 for processing an instruction accessing an address of an address space. At 310, a processor receives the instruction accessing an address of an address space. The address can be a partition absolute address (PAA) 330 of a partition absolute address space. PAA 330 may comprise a first section providing a MMIO index (MMIO_Idx) 332, which may be used to identify an entry 338 of the translation table providing a bus identifier Hardware Request Routing Address (HRRA) 340, and a remaining portion 334.

At 312, in order to identify entry 308 of the translation table, the processor multiplies the MMIO_Idx with a byte offset. The byte offset may e.g., be 16 bytes (where the *16 in FIG. 3 represents multiplication by 16).

At 314, the processor adds a MMIO table base address. The result may be the address of translation table entry 338. Entry 338 may comprise a bus identifier HRRA 340 identifying a bus. HRRA 340 may e.g., identify a drawer, cluster, port etc. The entry 338 may further comprise a base address (MMIO_base) 344 of the identified bus, i.e. a lower limit of the bus address space assigned to the identified bus, as well as a limit address (MMIO_limit) 342 of the identified bus, i.e. an upper limit of the bus address space assigned to the identified bus.

At 316, the remaining portion 334 of PAA 330 may e.g., be added to MMIO_base by the processor.

At 318, the processor checks whether the resulting bus address is within the bus address space assigned to the identified bus. In other words, the processor checks whether the result is smaller than MMIO_limit 342. In response to determining that the result is not smaller, the bus address is erroneous and lies without the bus address space assigned to the identified bus and e.g., a machine check may be performed at 320. In response to determining that the result is smaller, the bus address is a valid bus address of the bus address space assigned to the identified bus and a request is forwarded to the PBU identified by HRRA 340 at 322. More precisely, a request directed to a device accessible via the identified bus is sent via the identified bus to the bus address at 322.

At 324, a TLB entry comprising the result of the translation above is generated. The TLB entry can comprise the MMIO_Idx 332, the HRRA 340, the MMIO_limit 342, and the MMIO_base 344. The TLB entry can comprise the translation of the PAA 330. In some embodiments, a partition ID of a partition which issued the instruction can be assigned to the TLB entry.

Figure 4:
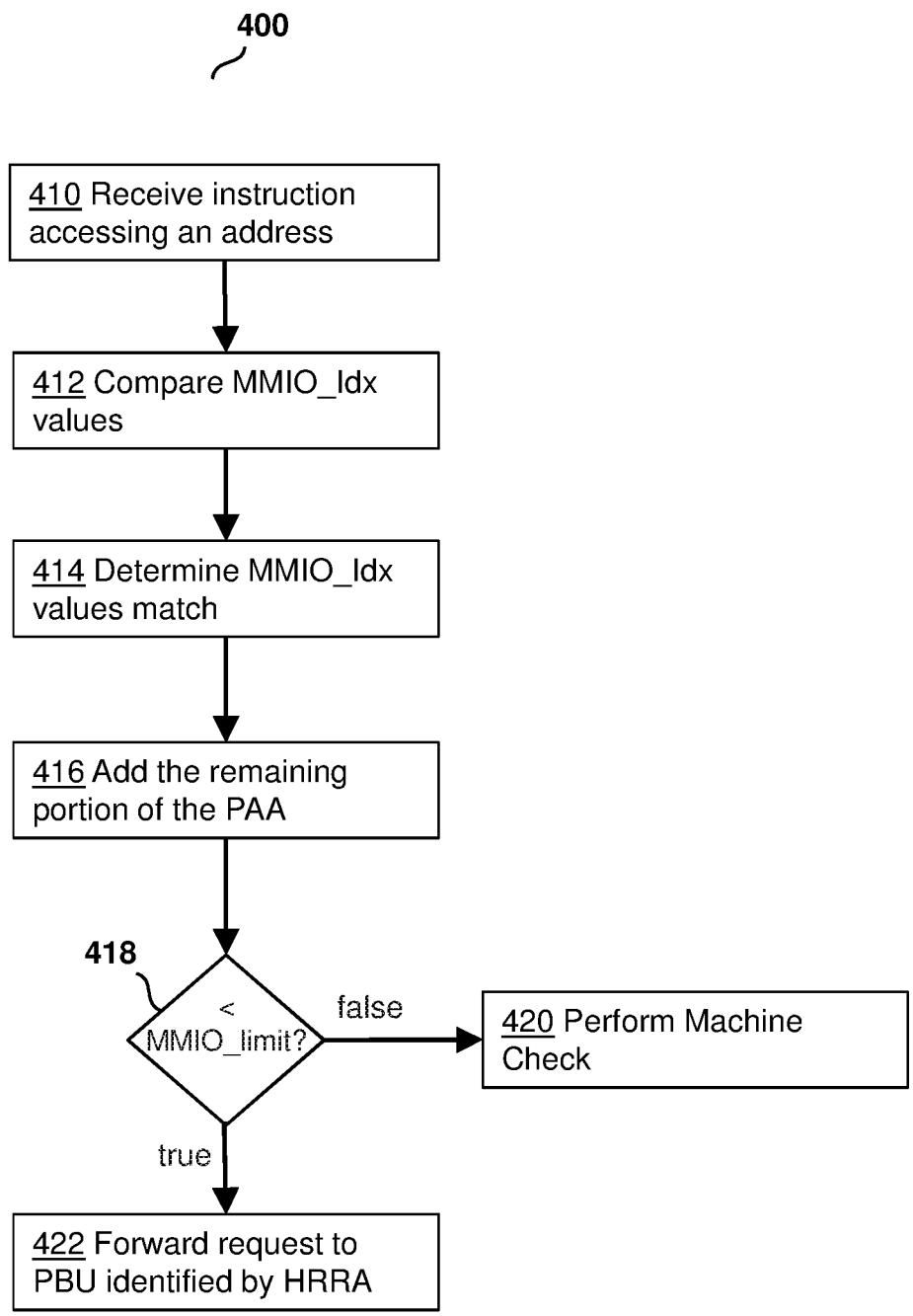
FIG. 4 depicts a schematic flow diagram of an example method for processing an instruction accessing an address of an address space using a TLB, in accordance with embodiments of the present disclosure.

FIG. 4 depicts a schematic flow diagram of an example method 400 for processing an instruction accessing an address of an address space using a TLB. At 410, a processor receives the instruction accessing an address of an address space. The address can be e.g., the MMIO address of FIG. 3 or a similar address.

At 412, the processor compares the MMIO_Idx (such as MMIO_Idx 332 of FIG. 3) with the MMIO_Idx values of the entries contained within the TLB. This can comprise checking whether the TLB contains an entry with a MMIO_Idx identical to the MMIO_Idx of the instruction. In some embodiments, this can also comprise checking whether a partition ID of the partition which issued the instruction is identical with a partition ID assigned to a TLB entry. At 414, the processor determines the MMIO_Idx values match.

In order to determine the bus address addressed by the address of the instruction, analogously to FIG. 3, the remaining portion of the address (e.g., 334 the address in FIG. 3) may e.g., be added to a MMIO_base at 416.

At 418, the processor checks whether the resulting bus address is within the bus address space assigned to the identified bus, similarly to operation 318 of FIG. 3. In other words, it is checked whether the result is smaller than MMIO_limit. In case the result is not smaller, the bus address is erroneous and lies without the bus address space assigned to the identified bus and e.g., a machine check may be performed at 420. In case the result is smaller, the bus address is a valid bus address of the bus address space assigned to the identified bus and a request is forwarded to the PBU identified by HRRA at 422. According to some embodiments, the request may be aggregated in an aggregation buffer and the aggregated requests may be forwarded together using write combine.

Figure 5:
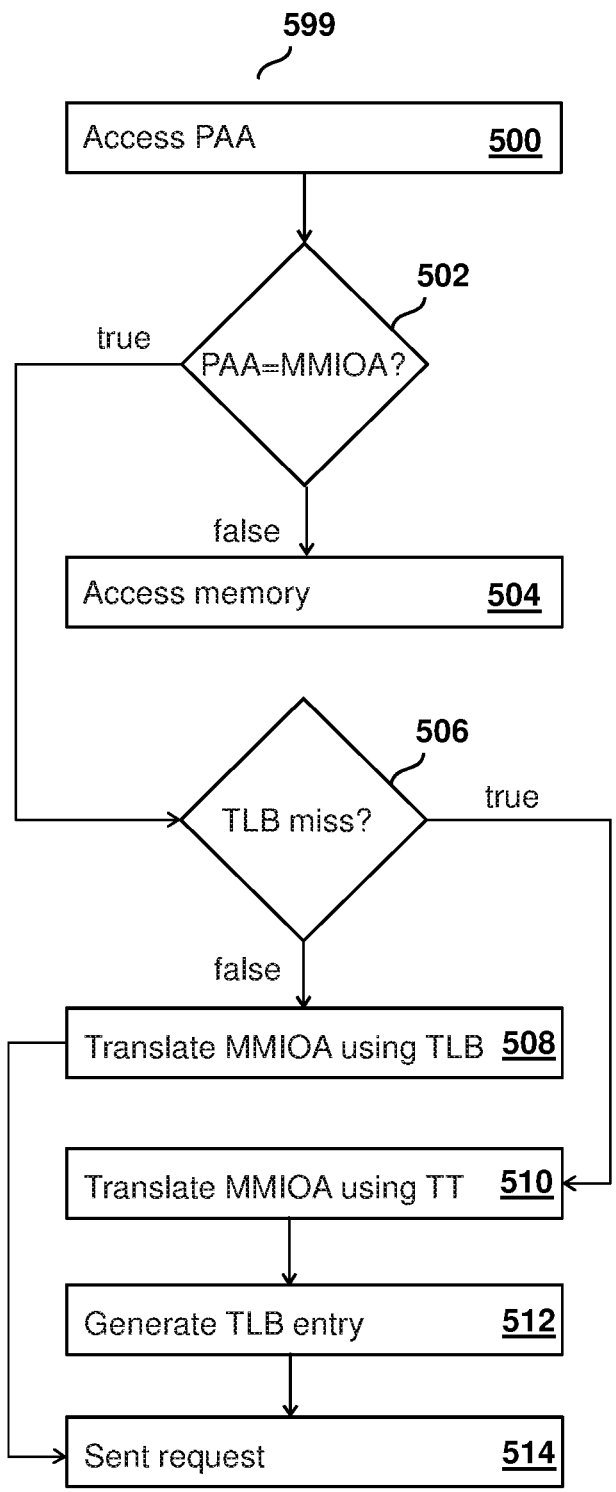
FIG. 5 depicts a schematic flow diagram of an exemplary method for processing an instruction accessing a partition absolute address, in accordance with embodiments of the present disclosure.

FIG. 5 depicts a schematic flow diagram of an example method 599 for processing an instruction accessing a partition absolute address. At 500, the partition absolute address is accessed by the instruction. At 502, it is checked whether the PAA is an MMIO address (MMIOA), i.e. whether the PAA is within the MMIO range. If this is not the case, the PAA may be an address mapping an address of a memory. Thus, at 504, the memory is accessed. If it is within the MMIO range, it is checked at 506 whether a TLB miss occurs, when querying the TLB for an entry providing a translation of the PAA (i.e. there is no entry in the TLB corresponding to the PAA). If no TLB miss occurs, i.e. if the TLB provides a translation of the PAA, the MMIOA provided in form of the PAA is translated using the TLB at 508 in order to provide a bus identifier and a bus address. If a TLB miss occurs, the MMIOA is translated at 510 using the translation table (TT) in order to provide the bus identifier and the bus address. Furthermore, an entry of the TLB is generated at 512 using the results of 510. At 514, a request is sent to the translation result of 508 or 510, respectively.

According to some embodiments, the TLB used for the MMIO addresses may buffer translations of MMIO addresses to explicit physical target addresses plus an offset within the respective physical target. The physical target may e.g., be a PHB (PCIe host bridge) connecting the CPU/memory domain of a computer system to a PCIe bus. The TLB used for the MMIO addresses may further buffer information if write combining should be executed using an aggregation buffer or if the data to be written should rather be forwarded right away to the PCIe device.

According to some embodiments, the processor determines whether the bus address resulting from the translation lies within the range of the bus address space assigned to the bus identified by the bus identifier resulting from the translation. According to some embodiments, in case the bus address resulting from the translation does not lie within the range of the bus address space assigned to the bus identified by the bus identifier resulting from the translation, the processor prevents that a request based on the instruction is sent. Embodiments may have the beneficial effect of ensuring that the bus address resulting from the translation lies within the range of the bus address space assigned to the bus identified by the bus identifier resulting from the translation. In these embodiments, only if this is the case, a request directed to the device is sent via the identified bus to the bus address. Otherwise, the MMIO address used may be erroneous. Thus, using an erroneous MMIO address is prevented which otherwise could result in sending a request to a wrong device.

According to some embodiments, the translation lookaside buffer comprises identifiers identifying an upper and a lower limit of the bus address space assigned to the bus identified by the bus identifier resulting from the translation. The identifiers identifying the upper and the lower limit are used for determining whether the resulting bus address lies within the range defined by the upper and the lower limit. Embodiments may have the beneficial effect of providing an efficient approach using the translation lookaside buffer to determine whether the bus address resulting from the translation lies within the range of the bus address space assigned to the bus identified by the bus identifier resulting from the translation.

According to some embodiments, the translation table comprises identifiers identifying an upper and a lower limit of the bus address space assigned to the bus identified by the bus identifier resulting from the translation. The identifiers identifying the upper and the lower limit are used for determining whether the resulting bus address lies within the range defined by the upper and a lower limit. Embodiments may have the beneficial effect providing an efficient approach using the translation table to determine whether the bus address resulting from the translation lies within the range of the bus address space assigned to the bus identified by the bus identifier resulting from the translation.

According to some embodiments, the address being accessed by an instruction comprises a first section encoding an identifier for identifying the bus identifier. According to some embodiments, the identifier for identifying the bus identifier comprises an entry identifier identifying an entry in the translation lookaside buffer. The respective entry to be identified is assigned with an equal entry identifier. A translation lookaside buffer hit results from finding the entry identifier provided by the address to be accessed in an entry in the translation lookaside buffer assigned with an equal entry identifier. Embodiments may have the beneficial effect of efficiently providing the bus identifier. According to some embodiments, a translation lookaside buffer miss results from not finding the entry identifier provided by the address to be accessed in an entry in the translation lookaside buffer assigned with an equal entry identifier.

According to some embodiments, the address comprises a second section encoding the bus address of the bus address space assigned to the device accessible via the bus identified by the first section.

According to some embodiments, the identifier for identifying the bus identifier comprises an entry identifier identifying an entry in the translation table providing the bus identifier. Embodiments may have the beneficial effect of efficiently providing the bus identifier.

According to some embodiments, in case the translation lookaside buffer has no remaining capacity for adding additional entries, the generating of an entry in the translation lookaside buffer comprises replacing an existing entry of the translation lookaside buffer with the entry to be generated. Embodiments may have the beneficial effect that by limiting the capacity of the translation lookaside buffer, only a limited number of previous translation results may be buffered. Thus, it may be ensured that searching the buffer may be fast.

According to some embodiments, entries comprised by the translation lookaside buffer can be each assigned to individual partitions. The address space comprising the address accessed by the instruction can be an absolute partition address space assigned to a partition and the instruction can be an instruction issued by the respective partition. Embodiments may have the beneficial effect of providing partition individual entries. Thus, e.g., different access rights may be defined for different partitions.

According to some embodiments, the translation table can be assigned to the partition and the instruction can be an instruction issued by the partition. Embodiments may have the beneficial effect of providing partition individual translation tables. Thus, e.g., different access rights may be defined for different partitions.

According to some embodiments, the processor can be provided with a partition identifier identifying the partition issuing the instruction. Embodiments may have the beneficial effect of that the processor is enabled to identify which partition is issuing the instruction and thus trying to access the MMIO address and via the MMIO address, the underlying bus and bus address. The partition identifier may e.g., be used to identify an entry of the translation lookaside buffer and/or a translation table assigned to the respective partition.

According to some embodiments, the translation table provides translations for each address of the MMIO range and to each address of the MMIO range an access indicator is assigned. The access indicator indicates, whether an access to the respective address of the MMIO range is allowed. The processor uses the access indicator to check whether the access the address being accessed by the instruction is allowed. In case the access is not allowed, the processor prevents that a request based on the instruction is sent. Embodiments may have the beneficial effect that all MMIO addresses are visible for a partition, but that using the access indicator access rights may be defined restricting the access rights of the respective partition.

According to some embodiments, in order to prevent that a request based on the instruction is sent, when the access is not allowed, the processor may interrupt the processing of the instruction and a pending interrupt may be generated or the instruction may be ignored by the processor. Furthermore, an exception may be indicated by the processor.

According to some embodiments, the translation table only provides translations for addresses of the MMIO range which the partition is allowed to access. In case translation table provides no translation for the address being accessed by the instruction, no request based on the instruction is sent. Embodiments may have the beneficial effect that translations are only provided for MMIO address which the partition is allowed to access. For other MMIO addresses no translations are provided. Thus, the processor is unable to send a request directed to the device based on an instruction trying to access such an MMIO address.

According to some embodiments, write combine is enabled for the addresses of the MMIO range using an aggregation buffer for aggregating requests. As used herein, write combine refers to a computer bus technique for allowing data to be combined and temporarily stored in the aggregation buffer to be released together later in burst mode. Embodiments may have the beneficial effect of providing an efficient approach to execute a plurality of write instructions.

The aggregation buffer may collect consecutive stores on incrementing addresses. In some embodiments, a number $2^N$ boundaries may apply. Possible aggregation approaches may comprise: when a store operation is non-aggregating, the written bytes of the aggregation buffer may be sent to the PBU indicated by the translation performed using the TLB. When an existing PCIe instruction is issued, firmware may push out the buffer before executing the instruction.

According to some embodiments, for each combination of bus identifier and bus address, two addresses are provided in the MMIO range. A first address is provided for executing a write through to the respective bus address and a second address is provided for executing a write combine to the respective bus address. Embodiments may have the beneficial effect of efficiently implementing a write through mode as well as a parallel write combine mode. Depending on the MMIO address accessed, it may be chosen between the write through mode and the write combine mode.

For example, a write combining enabled bit may be added to the MMIO address range for controlling aggregation/ordering. For example, an unused bit may be considered, e.g., bit 1. Thus, each bus address may be seen as mapped twice into the MMIO address range, once with write combined ordering and once with write through ordering.

According to some embodiments, the bus identifier comprises one or more of the following for identifying the bus: a node number, a chip number, a bus unit number, or a bus number. Embodiments may have the beneficial effect of providing an efficient bus identifier.

According to some embodiments, an MMIO capability bit is added to a query function for an operating system (OS) to identify if the system supports the embodiments of the present disclosure discussed herein. If the capability bit is set, the firmware may configure BAR spaces in PCIe devices to contain proper physical addresses (PAs) before signaling hot plug to the OS. Furthermore, the OS may be configured to actually use these PAs. In some embodiments, the TLB may be invisible to the OS.

According to some embodiments, the computer system further is configured to execute any of the embodiments of the method for processing the instruction by the processor as described herein.

It is understood that one or more of the aforementioned embodiments of the invention may be combined as long as the combined embodiments are not mutually exclusive. Ordinal numbers, like e.g., 'first' and 'second', are used herein to indicate different element assigned with the same name, but do not necessarily establish any order of the respective elements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for processing an instruction by a processor, wherein the processor is operationally connected to one or more buses, wherein the method comprises:
   determining the instruction is to access an address of an address space, wherein the address space maps a memory and additionally comprises a range of Memory Mapped Input/Output (MMIO) addresses, wherein the instruction was issued by a first partition of a plurality of partitions executing on the processor, wherein the processor is provided with a first partition identifier for the first partition that identifies the first partition as having issued the instruction
   determining the address being accessed by the instruction is within the range of MMIO addresses;
   determining that the first partition is permitted to access the address using the first partition identifier;
   determining that the address being accessed is not in a translation lookaside buffer;
   generating, in response to determining that the address being accessed is not in the translation lookaside buffer and that the first partition is permitted to access the address, a first translation of the address being accessed to a bus identifier and a bus address using a translation table assigned to the first partition, wherein the bus identifier identifies one of the buses, wherein the bus address is in a bus address space assigned to the identified bus, and wherein the bus address resulting from the translation is assigned to a device accessible via the identified bus;
   generating an entry for the address being accessed in the translation lookaside buffer, wherein the generated entry enables a translation of the address being accessed to the bus identifier and the bus address resulting from the translation using the translation table; and
   sending, based on the instruction, a request directed to the device via the identified bus to the bus address resulting from the first translation.

2. The method of claim 1 further comprising:
   receiving a second instruction;
   determining the second instruction is to access the address of the address space;
   generating, based on the determination that the address being accessed is within the range of MMIO addresses, a second translation of the address being accessed to a bus identifier and a bus address using the translation lookaside buffer, the bus identifier identifying one of the buses, wherein the bus address is in a bus address space assigned to the identified bus; and
   sending, based on the second instruction, a second request directed to the device via the identified bus to the bus address resulting from the second translation.

3. The method of claim 2, wherein the processor determines whether the bus address resulting from the second translation lies within the range of the bus address space assigned to the bus identified by the bus identifier resulting from the second translation.

4. The method of claim 3, wherein the translation lookaside buffer contains identifiers identifying an upper limit and a lower limit of the bus address space assigned to the bus identified by the bus identifier resulting from the second translation for determining whether the resulting bus address lies within the range defined by the upper limit and the lower limit.

5. The method of claim 3, wherein the translation table comprises identifiers identifying an upper limit and a lower limit of the bus address space assigned to the bus identified by the bus identifier resulting from the first translation for determining whether the resulting bus address lies within the range defined by the upper limit and the lower limit.

6. The method of claim 2, wherein the address being accessed by the instruction comprises a first section encoding an identifier for identifying the bus identifier.

7. The method of claim 6, wherein the identifier for identifying the bus identifier comprises an entry identifier identifying an entry in the translation lookaside buffer, wherein the respective entry to be identified is assigned with an equal entry identifier and wherein a translation lookaside buffer hit results from finding the entry identifier provided by the address to be accessed in an entry in the translation lookaside buffer assigned with an equal entry identifier, and
   wherein a translation lookaside buffer miss results from finding the entry identifier provided by the address to be accessed to not match any entry in the translation lookaside buffer assigned with an equal entry identifier.

8. The method of claim 6, wherein the address comprises a second section encoding the bus address of the bus address space assigned to the device accessible via the bus identified by the first section.

9. The method of claim 6, wherein the identifier for identifying the bus identifier comprises an entry identifier identifying an entry in the translation table providing the bus identifier.

10. The method of claim 1, wherein the translation lookaside buffer has no remaining capacity for adding additional entries, and wherein the generating of the entry in the translation lookaside buffer comprises replacing an existing entry of the translation lookaside buffer with the entry to be generated.

11. The method of claim 1, wherein the buses are PCIe (Peripheral Component Interconnect Express) buses, wherein the device is a PCIe device and wherein the bus address is a PCIe bus address.

12. The method of claim 1, wherein entries in the translation lookaside buffer are each assigned to individual partitions, and wherein the address space comprising the address accessed by the instruction is an absolute partition address space assigned to the first partition.

13. The method of claim 1, wherein the translation table contains translations for each address of the MMIO range, wherein each address of the MMIO range has an assigned access indicator which indicates whether an access to the respective address of the MMIO range is allowed.

14. The method of claim 1, wherein the translation table only contains translations for addresses of the MMIO range that the first partition is allowed to access, and wherein a second translation table contains translations for addresses of the MMIO range that a second partition of the plurality of partitions is allowed to access.

15. The method of claim 1, wherein write combine is enabled for the addresses of the MMIO range using an aggregation buffer for aggregating requests.

16. The method of claim 15, wherein for each combination of bus identifier and bus address two addresses are provided in the MMIO range, wherein a first one of the two addresses is provided for executing a write through to the respective bus address and a second one of the two addresses is provided for executing a write combine to the respective bus address.

17. A system for processing an instruction by a processor comprising:
one or more processors, wherein the one or more processors are operationally connected to one or more buses;
a plurality of partitions executing on the one or more processors; and
a memory communicatively coupled to the one or more processors,
wherein the memory comprises instructions which, when executed by the one or more processors, cause the one or more processors to perform a method comprising:
determining that a received instruction is to access an address of an address space, wherein the address space maps a memory, and wherein the address space additionally comprises a range of Memory Mapped Input/Output (MMIO) addresses, wherein the instruction was issued by a first partition of the plurality of partitions, wherein the one or more processors are provided with a first partition identifier for the first partition that identifies the first partition as having issued the instruction;
determining the address being accessed by the instruction is within the range of MMIO addresses;
determining that the address being accessed is not in a translation lookaside buffer;
accessing, in response to determining that the address being accessed is not in the translation lookaside buffer, a translation table assigned to the first partition using the first partition identifier, wherein the translation table enables translation of MMIO addresses that the first partition is permitted to access into bus identifiers and bus addresses;
generating, in response to determining that the address being accessed is not in the translation lookaside buffer, a first translation of the address being accessed to a first bus identifier and a first bus address using the translation table assigned to the first partition, wherein the first bus identifier identifies one of the buses, wherein the first bus address is in a bus address space assigned to the identified bus, and wherein the first bus address resulting from the translation is assigned to a device accessible via the identified bus;
generating a first entry for the address being accessed in the translation lookaside buffer, wherein the generated first entry associates the address being accessed to the first bus identifier and the first bus address identified by the first translation, wherein the first entry is assigned to the first partition such that only the first partition has access to the first entry, and wherein the first entry enables a second translation of the address being accessed to the first bus identifier and the first bus address using the translation lookaside buffer; and
sending, based on the instruction, a request directed to the device via the identified bus to the first bus address resulting from the first translation.

18. A computer program product for processing an instruction by a processor, the computer program product comprising a computer readable storage medium having machine executable program instructions embodied therewith, wherein the computer readable storage medium is not a transitory signal per se, the program instructions executable by a computer to perform a method comprising:
determining the instruction is to access an address of an address space, wherein the address space maps a memory, and wherein the address space additionally comprises a range of Memory Mapped Input/Output (MMIO) addresses, wherein the instruction was issued by a first partition of a plurality of partitions executing on the processor, wherein the processor is provided with a first partition identifier for the first partition that identifies the first partition as having issued the instruction;
determining the address being accessed by the instruction is within the range of MMIO addresses;
determining that the first partition is permitted to access the address using the first partition identifier;
determining that the address being accessed is not in a translation lookaside buffer;
generating, in response to determining that the address being accessed is not in the translation lookaside buffer and that the first partition is permitted to access the address, a first translation of the address being accessed to a bus identifier and a bus address using a translation table assigned to the first partition, wherein the bus identifier identifies one of the buses, wherein the bus address is in a bus address space assigned to the identified bus, and wherein the bus address resulting from the translation is assigned to a device accessible via the identified bus;
generating an entry for the address being accessed in the translation lookaside buffer, wherein the generated entry associates the address being accessed to the bus identifier and the bus address identified by the first translation, and wherein the entry enables a second translation of the address being accessed to the bus identifier and the bus address using the translation lookaside buffer; and
sending, based on the instruction, a request directed to the device via the identified bus to the bus address resulting from the first translation.

19. A method for processing an instruction by a processor, the method comprising:
receiving an instruction to access a Memory Mapped Input/Output (MMIO) address of an address space that includes a range of MMIO addresses for one or more connected devices, wherein the instruction was issued by a first partition of a plurality of partitions executing on the processor, wherein the processor is provided with a first partition identifier for the first partition that identifies the first partition as having issued the instruction;
querying a translation lookaside buffer (TLB) for the MMIO address, wherein the TLB maps MMIO addresses to associated bus addresses and bus identifiers, wherein each entry in the TLB comprises a hardware request routing address, a lower limit of the bus address space for an associated bus, and an upper limit of the bus address space for the associated bus;
identifying determining, in response to the MMIO address being in the TLB, that the first partition is permitted to access the MMIO address by comparing the first partition identifier to an entry for the MMIO address in the TLB, wherein each entry in the TLB is assigned to a particular partition of the plurality of partitions;

identifying, in response to determining that the first partition is permitted to access the MMIO address based on the first partition identifier matching , a bus address associated with the MMIO address using the TLB, the bus address being assigned to a device of the one or more connected devices; and transmitting, based on the instruction, a request to the device via the bus address.

20. The method of claim 19, wherein the MMIO address has an associated access indicator, the access indicator for the MMIO address indicating whether access to the MMIO address is permitted or not, and wherein the method further comprises:

determining that the access indicator for the MMIO address indicates that access to the MMIO address is permitted prior to transmitting the request to the device.

21. A method comprising:

receiving, by a processor, an instruction to access a Memory Mapped Input/Output (MMIO) address of an address space that includes a range of MMIO addresses, wherein the instruction was issued by a first partition of a plurality of partitions executing on the processor, wherein the processor is provided with a first partition identifier for the first partition that identifies the first partition as having issued the instruction;

determining that the MMIO address is not in a translation lookaside buffer (TLB);

translating, in response to determining that the MMIO address is not in the TLB, using a translation table associated with the first partition, the MMIO address to a bus identifier and a bus address in response to determining that the first partition is permitted to access the MMIO address using the first partition identifier, wherein the bus identifier identifies a first bus of a plurality of buses connected to the processor, the bus address being assigned to a device accessible via the first bus;

sending, based on the instruction, a request directed to the device to the bus address via the identified bus.

22. The method of claim 21, wherein receiving the instruction to access the MMIO address comprises:

receiving an instruction to access a partition absolute address of the address space; and determining that the partition absolute address is within the range of MMIO addresses.

23. The method of claim 21, wherein determining that the MMIO address is not in the TLB comprises:

querying the TLB for the MMIO address, wherein the TLB maps MMIO addresses to associated bus addresses and bus identifiers; and receiving a TLB miss indicating that the MMIO address is not in the TLB, wherein the translating is performed in response to receiving the TLB miss; and wherein the method further comprises:

generating, in response to the translating, an entry for the MMIO address in the TLB, wherein the entry associates the MMIO address with the bus identifier and the bus address.

24. The method of claim 21, wherein each partition of the plurality of partitions has its own assigned translation table that only contains translations for MMIO addresses that the corresponding partition is permitted to access, and wherein determining that the first partition is permitted to access the MMIO address using the first partition identifier comprises:

determining, using the first partition identifier, that the translation table includes translations of MMIO addresses that are accessible to the first partition; and determining that the MMIO address is in the translation table.

25. The method of claim 19, the method further comprising:

receiving, from a second partition having a second partition identifier, a second instruction to access the MMIO address;

determining, in response to the MMIO address being in the TLB, that the second partition is not permitted to access the MMIO address by comparing the second partition identifier to the entry for the MMIO address in the TLB, interrupting, by the processor, processing of the second instruction in response to determining that the second partition is not permitted to access the MMIO address; and raising, by the processor, an exception in response to determining that the second partition is not permitted to access the MMIO address.

* * * * *